United States Patent Office 3,704,132
Patented Nov. 28, 1972

3,704,132
PURIFICATION OF COFFEE OIL AS A STABLE
COFFEE AROMA CARRIER
Rudolf G. K. Strobel, Colerain Township, Hamilton County, Ohio, assignor to The Procter & Gamble Company, Cincinnati, Ohio
No Drawing. Filed Mar. 19, 1971, Ser. No. 126,305
Int. Cl. A23f 1/04
U.S. Cl. 99—65
5 Claims

ABSTRACT OF THE DISCLOSURE

A method of obtaining a stable coffee oil which comprises primarily triglycerides and which is substantially free of diterpene esters. The stabilized coffee oil is obtained by utilization of particular vacuum distillation conditions to distill crude coffee oil, and to yield vacuum distilled coffee oil which is substantially diterpene ester-free and resistant to oxidation and rapid rancidity development.

BACKGROUND OF THE INVENTION

The prior art is replete with references relating to low temperature condensation of coffee aroma frost. These aroma frosts are low temperature condensates of volatiles which escape during the grinding operation, steam distillation, the roasting operation, and dry distillation of roast and ground coffees. These volatile constituents are often obtained by low temperature condensation of the escaping gaseous material, for example at liquid nitrogen temperatures, by passing the escaping gas through a liquid nitrogen trap to yield the condensate which is referred to herein as an aroma frost. The aroma frost may be grinder gas frost, roaster gas frost, a dry distillation frost, or a steam distillation frost, or the like. For examples of patents relating to methods of providing aroma frosts, see for example, Lemonnier, U.S. Pat. 2,680,687, issued June 8, 1954, and U.S. Pat. 3,021,218, Clinton et al., issued Feb. 13, 1962.

However, once obtained, to be of value aroma frost must then be incorporated in a relatively stable manner into the coffee product which is to have its aroma increased. Usually this product comprises an instant coffee because instant coffees are notably deficient in characteristic natural roast and ground coffee aroma. It has been found that little or no value is obtained by merely placing aroma frost in conventional instant coffee products because upon one jar opening all of the aroma escapes. However, some aroma is retained providing the instant coffee has previously been sprayed, or come into contact with in some other manner, coffee oil. For some reason, not known, the coffee oil acts as a stabilizing factor in allowing retention of the aroma frost aroma within the aromatized instant coffee.

Conventionally prepared coffee oil is obtained by utilizing extraction methods well known in the art to obtain the oil from roast and ground coffee. Generally, two basic extraction methods are employed. The first comprises a liquid extraction process where extractives such as ether are utilized to remove coffee oil from roast and ground coffee. In this process the extractive after contact with the roast and ground coffee is removed to yield a residue of coffee oil. However, the far more common process comprises expressing coffee oil from roast and ground coffee beans by subjecting the beans to extreme pressure conditions. The product of this process is often referred to as "expressed coffee oil," and since expressed coffee oil has the advantage of not requiring the addition of foreign materials to obtain the coffee oil, expressed coffee oil is most often utilized in the processing of instant coffees.

Expressed coffee oil or liquid extracted coffee oil, both hereinafter referred to as crude coffee oil, contains a variety of compounds among which are paraffins, sterol esters, triglycerides, diglycerides, monoglycerides, free sterols, diterpene esters, and polar lipids such as phospholipids. It has now been found that some of these compounds, even though initially desirable in presenting a sensory impact of roast and ground coffee, are undesirable when crude coffee oil is utilized as an aroma carrier for aroma frost. In other words, once aroma frost is incorporated into crude coffee oil, it has been found that in a very short period of time the entire mass, i.e. the aroma essence plus the coffee oil carrier, becomes rancid and the aroma becomes unappealing because of the development of the characteristic aroma of stale coffee. It is believed that this development of rancidity is caused by subjecting crude coffee oil to light and oxygen, which causes the conversion of some compounds such as diterpene esters which are present in the coffee oil into free radical form which in turn causes further deterioration and the development of rapid rancidity. Therefore, if crude coffee oil is utilized as an aroma carrier for aroma frost, any initial advantage obtained by the aroma frost is negatived after the product has been exposed to light and oxygen for a short period of time.

This invention relates to a method of purifying crude coffee oil which stabilizes that coffee oil so that it is a more suitable vehicle for coffee aroma frost incorporation to yield a coffee aroma carrier which does not develop rapid rancidity and stale coffee aroma.

SUMMARY OF THE INVENTION

The process of this invention comprises vacuum distillation of coffee oil, under certain specified critical conditions, to remove compounds such as unsaturated diterpene esters. Once removed by a careful distillation procedure these undesirable compounds can no longer contribute to the rapid development of rancidity and stale coffee aroma and therefore the purified coffee oil is suitable for a stable aroma carrier for aroma frost.

DETAILED DESCRIPTION OF THE INVENTION

In its broadest aspect this invention relates to a process which comprises vacuum distillation of crude coffee oil to remove undesirable constituents such as diterpene esters and to yield a residue of purified coffee oil which is substantially comprised of triglycerides, and which when subjected to light and oxygen does not develop rapid rancidity and a stale coffee aroma.

Crude coffee oil has been vacuum distilled heretofore. See, for example, Feldman et al., U.S. Pat. 2,947,634, issued Aug. 2, 1960, which relates to obtaining highly desirable aromatic fragrances from crude coffee oils by distilling aromatic fragrances from expressed coffee oil at sub-atmospheric pressures under mild temperature conditions. In the Feldman patent process the various aromas are distilled from expressed coffee oil at temperatures ranging from 15° C. to 100° C., and at pressures generally less than 50 mm. of mercury, and preferably less than 10 mm. of mercury. The process of the Feldman patent has as its object the obtaining of various highly volatile fragrances from coffee oil, and, as will be seen hereinafter, his distillation process is carried out at maximum temperatures (i.e. 100° C.) which are insufficient to remove undesirable crude coffee oil constituents which substantially contribute to the development of rancidity and stale coffee aroma. Therefore, the residue remaining subsequent to the distillation process of Feldman is still crude coffee oil as that term is defined herein.

In fact, the first step of the process of this invention comprises distilling off all of the aroma fragrances which Feldman carefully distills and condenses to achieve the objects of his invention. In the first step of the process of this invention crude coffee oil is distilled at temperatures ranging from room temperature up to 115° C., at a pressure of from .1 mm. to 60 mm. for a time of up to 2 hours, and preferably from 1 to 2 hours. During this first distillation step, most of the highly volatile fugitive materials contained in the crude coffee oil are removed. If desired, these highly volatile aroma constituents contained in this first fraction can be saved and condensed in the manner taught by Feldman in U.S. Pat. 2,947,634, for subsequent incorporation into purified coffee oil or any other suitable coffee aroma carrier. However, if these aroma materials which evaporate at up to 115° C. are to be saved in the manner taught by Feldman, it is important that temperatures not exceeding 115° C. be employed because if they are, a substantial amount of undesirable compounds which will develop rancidity also are distilled along with the desirable aroma fragrances.

After the first distillation procedure in which the distillate is either retained to capture some desirable aroma fragrances or discarded, the residue is utilized in the second step which comprises a second vacuum distillation. In this second vacuum distillation the temperature ranges from 115° C. to 240° C. and the pressure is maintained at pressures as low as possible, but in any event the pressure must be below 100 microns. This second vacuum distillation procedure is carried out at temperatures of from 115° C. to 240° C. at a maximum pressure of 100 microns for from about 1 to about 3½ hours. During this second distillation procedure a major portion of the undesirable constituents contained in the crude coffee oil are distilled off and subsequently discarded. These undesirable constituents include the previously described diterpene esters, other sterol esters, and decomposed rancidified aroma compounds.

Subsequent to completion of the above identified second fraction distillation, a third fraction distillation is completed. During this third fraction distillation temperatures from 240° C. to 310° C. are employed, and the vacuum is maintained at from 10 to 20 microns pressure absolute. The third fractional distillation is continued for from about 1½ to approximately 4 hours. Temperatures above 310° C. should be avoided because at the pressure conditions utilized herein temperatures much above that will decompose the desirable triglyceride component. The desirable triglyceride component is distilled over predominantly in this third fraction.

While a time limitation has been given in the preceding paragraph, i.e. up to 4 hours, it is to be understood that no criticality exists with this time period, and 4 hours is given merely as a practical upper limit. In actual practice this third distillation procedure is continued until thin layer chromatography results reveal a substantial absence of diterpene ester compounds in the purified coffee oil.

The distillate obtained from the third fraction comprises purified coffee oil that is substantially triglycerides. The yield, based upon the total weight of crude coffee oil utilized, generally is about 50% and can be increased to about 70% if the third fraction is re-distilled. It is preferred that redistillation of the third fraction be employed where the third fraction temperature range is from 240° C. to 310° C. However, if re-distillation is undesirable the third fraction preferably should be taken, in order to comprise substantially triglycerides, at temperatures of from 280° C. to 310° C. Where this higher temperature range is employed, i.e. 280° C. to 310° C., the entire fraction collected comprises substantially triglycerides; however, the yield is reduced to only 40%. It is therefore preferred, because of the higher yield, that the third fraction be obtained at temperatures within the range of from 240° C. to 310° C., and that re-distillation at temperatures and pressures within this same range be employed.

Although the aromatics are preferably distilled in a still providing a rapidly moving thin film of crude coffee oil, a variety of other stills may also be employed such as the falling film type of still which comprises two concentric cylinders in which the crude coffee oil is caused to flow in a thin film on the outer surface of the inner cylinder, the evaporated constituents being condensed in any suitable trap and the space enclosed by said cylinders being maintained under reduced pressure. Alternatively, the crude coffee oil can be atomized into fine droplets in a chamber maintained at reduced pressure, the condensate being collected in the aforesaid manner.

A preferred type of vacuum still is that described in U.S. Pat. 2,578,999, to Kenneth C. Hickman, patented Dec. 18, 1951. This still, which has come to be commonly referred to as a Hickman still, can conveniently be used to separate and isolate the purified coffee oil fraction from the crude coffee oil. The Hickman still includes a bell jar which can be evacuated by a forepump and a diffusion pump, the latter enabling the further reduction of absolute pressures by the forepump to a range below 1 mm. The crude coffee oil is placed in the bottom of the bell jar and raised by a lift pump and delivered to the face of a heated spinning approximately 4 to 6 inch diameter rotor having an indented conical surface. The distilland is returned to a reservoir in the bell jar after having traveled to the periphery of its spinning rotor under the action of centrifugal force. The rotor acts as a surface over which the distilland is caused to flow in a rapid moving thin film by centrifugal force. Of course, the necessary heat is provided by heating the rotor to the desired temperature which is carefully regulated by an appropriate rheostat. The Hickman still has advantages because the coffee oil is subjected to high temperatures only for a brief period of time because it either evaporates or is thrown by centrifugal force away from the heated rotor plate. That portion of crude coffee oil which evaporates is carried off to an appropriate condenser, and that portion which fails to evaporate is recycled for further subjection to the desired temperatures.

In the process of this invention the bell jar is connected to a condenser which, for the first fraction, assuming that it is desired to condense and retain these highly desirable aroma constituents, is held at liquid nitrogen temperatures, i.e. −185.8° C. The condensate from the second fraction has been found to be of little value and no advantage is obtained in saving it. However, if desired it can be condensed at room temperatures. The condensate from the third fraction which comprises that portion obtained at temperatures of from 240° C. to 310° C. comprises as a substantial portion the high boiling point triglycerides and because of their high boiling point, these compounds can be readily condensed by a condenser held at ambient conditions to yield a residue of purified coffee oil.

The purified coffee oil of this invention can be added to dry coffee products whose aroma is desired to be increased at common usage levels, generally in the range of from .1% to 1.0% by weight of the product. Of course it is also desirable to add aroma-bearing materials along with the purified coffee oil, for example, the condensate from the first distillation of the process of this invention. As used herein, the term "dry coffee product" includes roast and ground coffees as well as instant coffees. The term "aroma-bearing material" is intended to include all normal aroma sources such as aroma frost, steam distillates, and the like.

The following example is offered to illustrate the process of this invention.

EXAMPLE 1000 grams of expressed crude coffee oil obtained from the expressing method previously described is placed in a high vacuum Hickman still. Since a description of the still has been previously given, it will not be repeated herein. The bell jar of the Hickman still was air evacuated by means of the aforementioned forepump to an absolute pressure in the order of 5 mm. Because it was deemed desirable to obtain and save this first fraction of highly volatile aroma constituents, the cold finger in the condensing section of the Hickman still was filled with liquid nitrogen. The crude coffee oil which had been placed in the bell jar was delivered by a lift pump to the face of the spinning rotor which was operated under a temperature gradient starting at 25° C. and ending at 100° C. The oil was caused to flow over the rotor in a thin film. The rotor was operated at about 1400 r.p.m. and all of the oil was processed thereover in about 2 hours. At the end of this cycle the pressure in the still was in the order of 15 mm. The condensed aroma frost in the liquid nitrogen trap was removed.

After obtaining this first fraction, the remaining crude coffee oil in the bell jar was subjected to further distillation to obtain a second fraction at temperatures of from 100° C. to 240° C. and at a pressure ranging from 100 to 16 microns. This second fraction distillation procedure was continued for two hours, and condensate was collected at ambient temperatures. The condensate was analyzed by thin layer chromatography and found to contain a high percentage of decomposed aroma compounds, sterol esters, and diterpene esters. The smell of this condensate obtained from the second fraction was skunky, rancid, and remindful of stale coffee.

Thereafter the residue contained in the bell jar was subjected to further distillation to obtain the desirable third fraction. In this procedure the residue was subjected to vacuum distillation at a pressure ranging from 15 to 9 microns and a temperature ranging from 266° C. to 300° C. for a period of 4 hours. Thin layer chromatography revealed that a definite significant amount of diterpene esters were still present in this third fraction, and accordingly the third fraction was re-distilled under identical conditions. The third fraction was obtained in the previously described finger condenser trap of the bell jar utilizing ambient conditions. The second distillation showed a product which upon thin layer chromatography analysis was revealed to be nearly 100% triglycerides. The amount of purified coffee oil obtained was 60% by weight of the starting material.

Thereafter approximately .1% by weight of the condensed aroma frost obtained from fraction 1 was added back to the purified coffee oil and placed in a long vial. The vial was subjected to ambient light, temperature, and oxygen conditions for three weeks, after which it was smelled and found to still be coffee-like in aroma and totally without the rancid skunky characteristic aroma notes of stale vacuum coffee. Further tests showed that the purified coffee oil could be stored in refrigerated conditions for more than six months with no noticeable deterioration.

When the process of the above example is repeated utilizing temperatures within the range of 280° C. to 310° C. in regard to the third fraction, no re-distillation procedure is needed to obtain a substantially pure triglyceride coffee oil; however, the yield of purified coffee oil is only 40%.

When purified coffee oil prepared in accord with the process of this invention is added back to instant coffee at .5% by weight of the instant coffee, the instant coffee is noted, when subjected to ambient light, temperature, and oxygen conditions, to retain its characteristic aromatized smell for up to three weeks without developing rancidity characteristics usually associated with coffee oil which has been subjected to such conditions.

What is claimed is:

1. A method of obtaining a stable purified coffee oil which is substantially free of diterpene esters and suitable as an aroma frost carrier, comprising vacuum distillation of crude coffee oil at a pressure of from .1 to 60 mm. and a temperature up to 115° C. to remove highly desirable aroma constituents, and thereafter continuing vacuum distillation at temperatures from 115° C. to 240° C., and at a pressure not in excess of 100 microns to remove undesirable constituents such as sterol and diterpene esters and provide a residue, and thereafter continuing a vacuum distillation of the residue at a temperature of from 240° C. to 310° C. at a pressure ranging from 10 microns to 20 microns to yield a condensate comprising purified coffee oil which is substantially a triglyceride, and which is substantially diterpene ester-free.

2. The process of claim 1 wherein the residue from the 115° C. to 240° C. distillation is at least twice distilled at temperatures within the range of 240° C. to 310° C.

3. The process of claim 1 wherein the final vacuum distillation is conducted at temperatures of from 280° C. to 310° C.

4. The process of claim 1 wherein the highly desirable aroma constituents are condensed at liquid nitrogen temperatures and incorporated in the purified coffee oil.

5. Coffee products whose roast and ground coffee aroma is desired to be increased comprising a dry coffee product, the purified coffee oil produced by the method of claim 1 and an aroma-bearing material.

References Cited

UNITED STATES PATENTS

| | | | |
|---|---|---|---|
| 2,947,634 | 8/1960 | Feldman et al. | 99—71 |
| 3,021,218 | 2/1962 | Clinton et al. | 99—71 |
| 3,132,947 | 5/1964 | Mahlmann | 99—71 |
| 3,244,533 | 4/1966 | Clinton et al. | 99—71 |

FRANK W. LUTTER, Primary Examiner

W. L. MENTLIK, Assistant Examiner

U.S. Cl. X.R.

99—71